US009677601B1

(12) United States Patent
Jacquemin et al.

(10) Patent No.: US 9,677,601 B1
(45) Date of Patent: Jun. 13, 2017

(54) BOLTED-BALL BALL-AND-SOCKET PIVOTING JOINT ASSEMBLY

(71) Applicants: Joseph W. Jacquemin, Panama City Beach, FL (US); Pedro Bracho, Lynn Haven, FL (US)

(72) Inventors: Joseph W. Jacquemin, Panama City Beach, FL (US); Pedro Bracho, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 330 days.

(21) Appl. No.: 14/534,981

(22) Filed: Nov. 6, 2014

(51) Int. Cl.
*F16C 11/06* (2006.01)
*F16C 11/10* (2006.01)

(52) U.S. Cl.
CPC .......... *F16C 11/0604* (2013.01); *F16C 11/06* (2013.01); *F16C 11/0685* (2013.01); *F16C 11/0695* (2013.01); *F16C 11/106* (2013.01); *Y10T 403/32032* (2015.01); *Y10T 403/32311* (2015.01); *Y10T 403/32573* (2015.01); *Y10T 403/32639* (2015.01)

(58) Field of Classification Search
CPC ... F16C 11/0604; F16C 11/06; F16C 11/0685; F16C 11/10; F16C 11/103; F16C 11/106; F16C 11/0623; F16C 11/0628; F16C 11/069; F16C 11/0695; F16C 11/086; F16M 11/12; F16M 11/14; E04F 11/1834; B62D 27/04; B62D 27/065; Y10T 403/32032; Y10T 403/32204; Y10T 403/32311; Y10T 403/32573; Y10T 403/32639; Y10T 403/32655; Y10T 403/32737; Y10T 403/32803; Y10T 403/32631; Y10T 403/32811
USPC ...... 403/56, 77, 90, 115, 123, 125, 135, 143
See application file for complete search history.

(56) References Cited

U.S. PATENT DOCUMENTS

| | | | | |
|---|---|---|---|---|
| 135,401 | A | * | 2/1873 | Bradley ................. F16C 11/106 403/90 |
| 3,415,551 | A | * | 12/1968 | Korecky ............. F16C 11/0604 403/126 |
| 3,424,413 | A | * | 1/1969 | Applegate .............. B23Q 1/545 108/143 |
| 4,294,460 | A | * | 10/1981 | Kirsch .................... A63C 5/075 280/607 |

(Continued)

*Primary Examiner* — Josh Skroupa
*Assistant Examiner* — Cory B Siegert
(74) *Attorney, Agent, or Firm* — James T. Shepherd

(57) ABSTRACT

A pivoting joint assembly includes a base, a plate, and at least one bolt. The base has one or more semi-spherical sockets with each socket having a centrally-positioned hole extending through the base. The plate has one or more semi-spherical sockets recessed within the plate with aligned semi-spherical protrusions extending from the plate. The plate has a hole extending through a central portion of each of the plate's sockets and a corresponding protrusion aligned therewith. Each protrusion is partially fitted in a corresponding socket in the base. Each bolt has a head and a post extending from the head. The head includes a semi-spherical portion adjacent to the post. The post extends through aligned holes in the plate and base. The post is coupled to the base such that the semi-spherical portion of bolt's head nests within one of the plate's sockets.

5 Claims, 2 Drawing Sheets

(56) References Cited

U.S. PATENT DOCUMENTS

| | | | | |
|---|---|---|---|---|
| 4,629,352 A | * | 12/1986 | Nemoto | B60G 7/005 |
| | | | | 403/128 |
| 4,770,497 A | * | 9/1988 | Brown | G02B 7/183 |
| | | | | 359/896 |
| 6,971,757 B2 | * | 12/2005 | Ro | G02B 7/1827 |
| | | | | 248/477 |
| 2006/0122605 A1 | * | 6/2006 | Suh | A61B 17/8042 |
| | | | | 606/295 |
| 2008/0219756 A1 | * | 9/2008 | Grant | F16M 7/00 |
| | | | | 403/122 |

* cited by examiner

_US 9,677,601 B1_

BOLTED-BALL BALL-AND-SOCKET PIVOTING JOINT ASSEMBLY

ORIGIN OF THE INVENTION

The invention described herein may be manufactured and used by or for the Government of the United States of America for Governmental purposes without payment or any royalties thereon or therefore.

FIELD OF THE INVENTION

The invention relates generally to ball-and-socket joints, and more particularly to a ball-and-socket pivoting joint assembly providing pivot motion in at least one plane.

BACKGROUND OF THE INVENTION

Pivoting motion between two items is typically accomplished with some type of hinge or pivot mechanism. One type of well-known pivot mechanism is a ball-and-socket. Conventional ball-and-socket mechanism use either a one-piece socket or a two-piece socket. A one-piece socket generally requires a ball to "snap" into a hole in the socket such that exacting machine tolerances are required. A two-piece socket is generally assembled after the ball is placed between/in the two pieces of the socket such that multiple machined parts are required.

SUMMARY OF THE INVENTION

Accordingly, it is an object of the present invention to provide a pivoting joint assembly.

Another object of the present invention is to provide a pivoting joint assembly defining pivot movement in one or more planes.

Other objects and advantages of the present invention will become more obvious hereinafter in the specification and drawings.

In accordance with the present invention, a pivoting joint assembly includes a base, a plate, and at least one bolt. The base has one or more semi-spherical sockets defined in a first face thereof with each socket having a centrally-positioned hole extending through the base to a second face of the base opposing the first face of the base. The plate has one or more semi-spherical sockets recessed within the plate and corresponding semi-spherical protrusions extending from the plate. Each protrusion is aligned with one of the sockets recessed within the plate. The plate has a hole extending through a central portion of each socket recessed within the plate and a corresponding one of the protrusions aligned therewith. Each protrusion is partially fitted in a corresponding one of the sockets in the base such that each hole in the plate is aligned with the centrally-positioned hole of a corresponding one of the sockets in the base. Each bolt has a head and a post extending from the head. The head includes a semi-spherical portion adjacent to the post. The post extends through one hole in the plate and one centrally-positioned hole in the base. The post is coupled to the base such that the semi-spherical portion of the bolt's head nests within one socket recessed in the plate.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
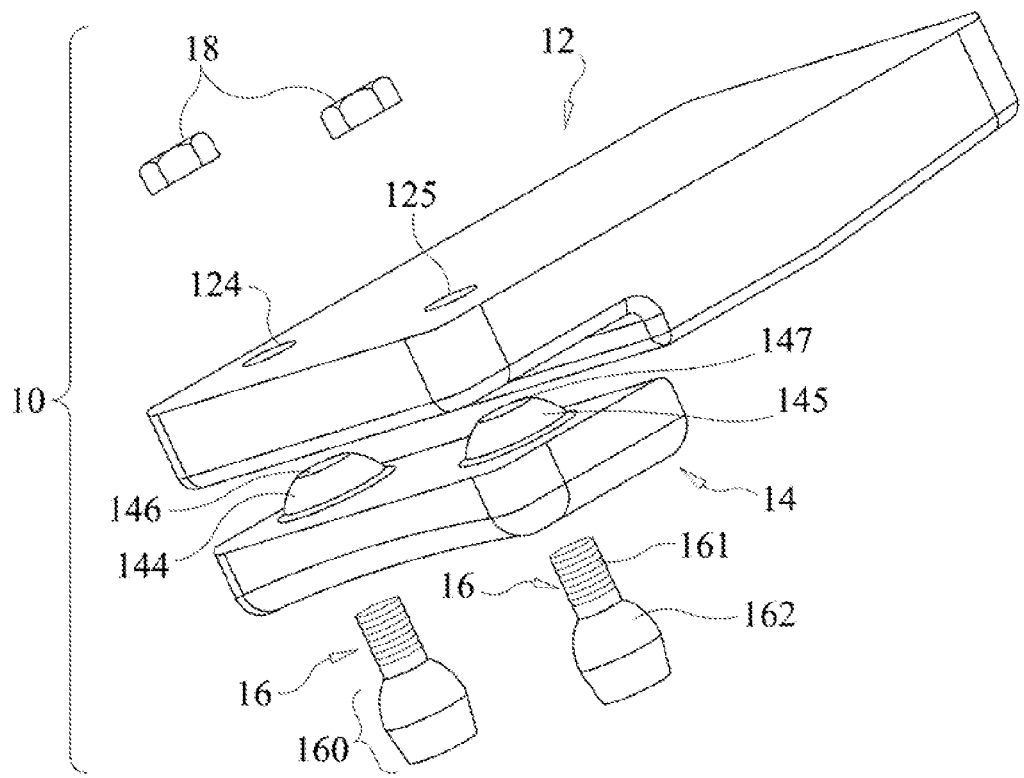
FIG. 1 is an exploded perspective view of a bolted ball-and-socket pivoting joint assembly in accordance with an embodiment of the present invention.
Figure 2:
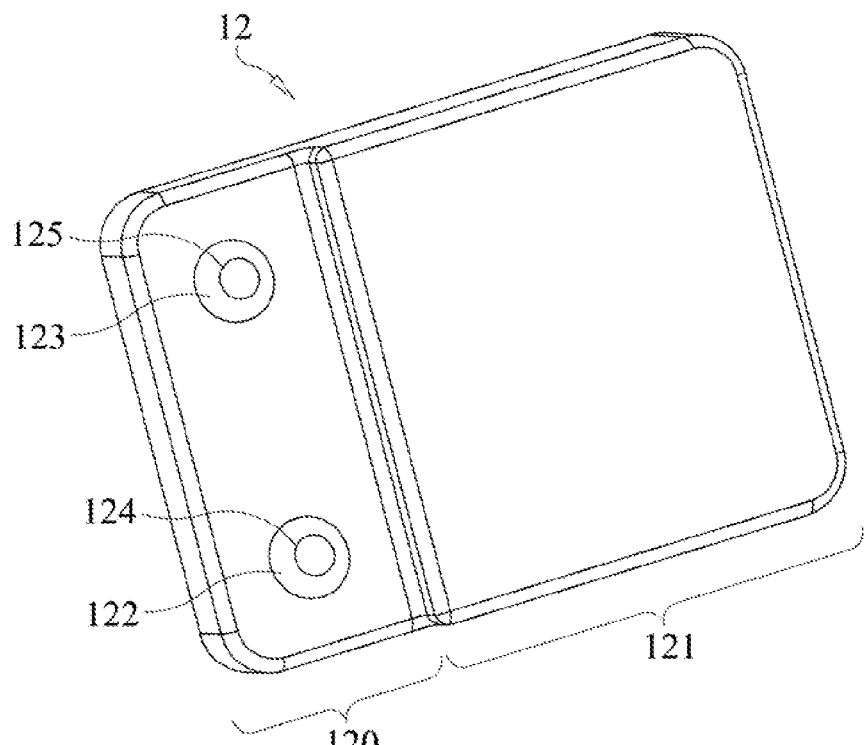
FIG. 2 is an isolated perspective view of the pivoting joint assembly's base.
Figure 3:
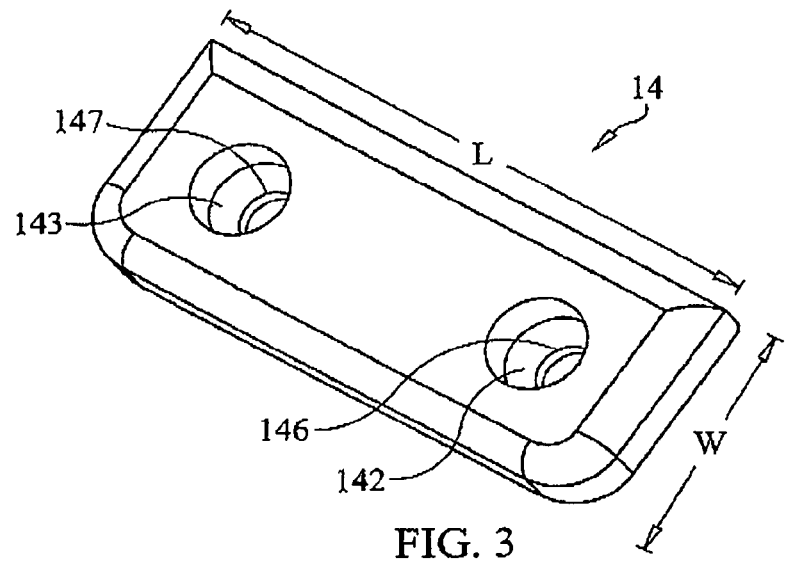
FIG. 3 is an isolated perspective view of the pivoting joint assembly's plate.
Figure 4:
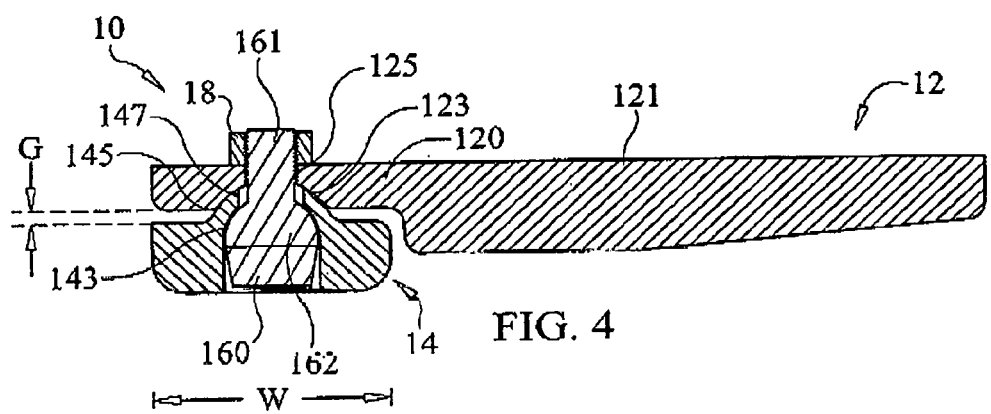
FIG. 4 is a cross-sectional view of the assembled pivoting joint assembly.
Figure 5:
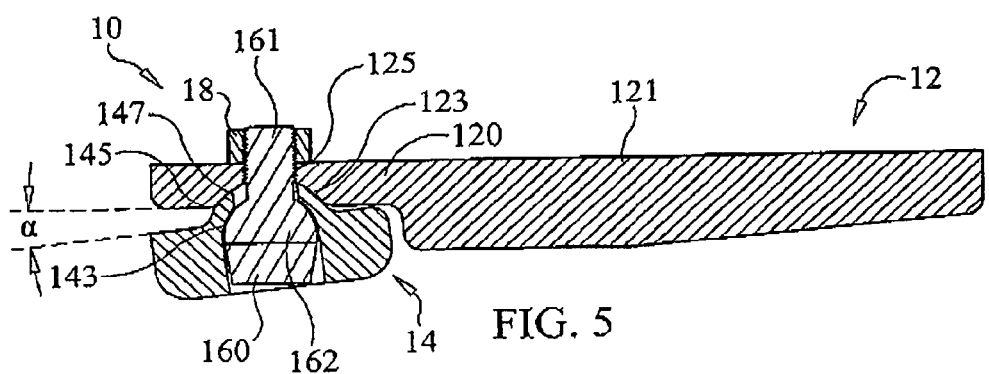
FIG. 5 is a cross-sectional view of the assembled pivoting joint assembly pivoted through its maximum angle.

Referring now to the drawings, simultaneous reference will be made to FIGS. 1-5 where a bolted-ball ball-and-socket pivoting joint assembly in accordance with an embodiment of the present invention is shown and is referenced generally by numeral 10. Pivoting is assembly 10 will generally be coupled to two items to permit a limited amount of pivot motion therebetween in a plane. FIG. 1 illustrates an embodiment of pivoting joint assembly 10 in an exploded view. FIG. 2 is an isolated view of the base of pivoting joint assembly 10. FIG. 3 is an isolated view of the plate of pivoting joint assembly 10. FIG. 4 illustrates a cross-section of the assembled pivoting joint assembly 10. FIG. 5 illustrates a cross-section of the assembled pivoting joint assembly 10 pivoted through its maximum angle.

Pivoting joint assembly 10 includes a base 12, a plate 14, and one or more bolts 16 used to couple plate 14 to base 12. Each of these components is generally made from a rigid material (e.g., metal, plastic, composite, etc.), the choice of which can be selected predicated on the needs of a particular application without departing from the scope of the present invention. The particular details related to shape, size, orientation, etc., of these components and their attributes that are relevant to the present invention will be described herein. However, it is to be understood that other features illustrated in the exemplary embodiment not germane to the present invention will not be discussed herein.

Base 12 includes a mating portion 120 that mates with plate 14 and a mounting portion 121 used to mount base 12 to an item/structure (not shown). The configuration of mounting portion 121 is not a limitation of the present invention. In the illustrated embodiment, mating portion 120 has two-semi-spherical sockets 122 and 123 defined therein. However, it is to be understood that the present invention also contemplates a pivoting joint assembly having only one socket (e.g., socket 122.) in base 12. As illustrated, each of sockets 122 and 123 has a hole 124 and 125, respectively, that extends through base 12. Each hole. 124 and 125 is centrally-positioned in its respective socket.

In the illustrated embodiment, plate 14 is generally rectangular and has a length L and a width W. Disposed along the length dimension of plate 14 are two semi-spherical sockets 142 and 143 recessed into the plate, and two. semi-spherical Protrusions 144 and 145, respectively. More specifically, socket 142 is aligned with protrusion 144, and socket 143 is aligned with protrusion 145. The central portion of socket/protrusion combinations 142/144 and 143/145 has a hole 146 and 147, respectively, defined therethrough. Note that in the case of a single socket in base 12, only a single socket/protrusion combination (e.g., socket/ protrusion combination 142/144) would be provided in plate 14. Protrusions 144 and 145 are positioned and sized to fit partially into sockets 122 and 123, respectively, of base 12. When plate 14 is positioned relative to base 12 in this fashion, a gap G is defined between plate 14 and base 12 (as shown in FIG. 4), with hole 124 aligned with hole 146 (not visible in FIG. 4) and hole 125 aligned with hole 147.

Plate 14 is retained against base 12 by bolts 16, each of which has a bolt head 160 and a post 161 extending from bolt head 160. Note that only a single bolt 16 is needed when base 12 has a single socket and base 14 has a single socket/protrusion combination. Regardless of the number of bolts, each bolt head 160 includes a semi-spherical region 162 adjacent post 161. Semi-spherical region 162 rests within one of sockets 142 and 143 (e.g., socket 143 in FIGS. 4-5) when post 161 extends through the aligned holes in plate 14 and base 12 (e.g., aligned holes 147 and 125 in FIGS. 4-5). Semi-spherical region 162 can be an integral part of bolt head 160 or could be a removable part that slides over post 161. Post 161 can be partially or completely threaded along its length for engagement with a threaded nut 18 thereby coupling post 16 to base 12. Nut 18 can be a separate element (as shown) or can be integrated with or into base 12 without departing from the scope of the present invention.

Once assembled as shown in FIG. 4, plate 14 can pivot relative to base 12 in a plane through an angle governed by the above-described gap G (FIG. 4), the width W of plate 14, and/or the size of holes 146/147 in plate 14. This is illustrated in FIG. 5 where plate 14 has pivoted through its maximum angle α when plate 14 contacts base 12. Changing gap G, width W, and/or the size of holes 146/147 provides for adjustment in maximum angle α. For embodiments using a single base socket and a single plate socket/protrusion combination, motion between the plate and base is not restricted to single plane of motion.

The advantages of the present invention are numerous. The semi-spherically mating components are easy to machine and are readily assembled to construct a pivoting joint assembly. The use of all semi-spherical shapes relaxes machine tolerances thereby making the assembly cost effective.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A pivoting joint assembly, comprising:

a base having two semi-spherical sockets defined in a first face thereof, each of said sockets in said base having a centrally-positioned hole extending through said base to a second face thereof opposing said first face;

a plate having a length and a width, said plate having two semi-spherical sockets recessed within said plate and two semi-spherical protrusions extending from said plate, each of said protrusions aligned with one of said sockets recessed within said plate, said protrusions and said sockets recessed within said plate being arranged along a line disposed along said length of said plate, said plate having a hole extending through a central portion of each of said sockets recessed within said plate and a corresponding one of said protrusions aligned therewith, each of said protrusions partially fitted in a corresponding one of said sockets in said base wherein a gap is defined between said first face of said base and said plate, and wherein each said hole in said plate is aligned with said centrally-positioned hole of a corresponding one of said sockets in said base; and two bolts, each of said bolts having a head and a threaded post extending from said head, said head including a semi-spherical portion adjacent said threaded post, said threaded post extending through one said hole in said plate and one said centrally-positioned hole in said base wherein said semi-spherical portion of said head nests within one of said sockets recessed in said plate, said threaded post being coupled to said base wherein said base and said plate pivot in a plane through a maximum angle governed only by a combination of said width of said plate, said gap, and a diameter of each said hole in said plate.

2. A pivoting joint assembly as in claim 1, wherein each said threaded post is in threaded engagement with said base.

3. A pivoting joint assembly as in claim 1, further comprising a nut for threaded engagement with each said threaded post extending through said centrally-positioned hole in said base.

4. A pivoting joint assembly as in claim 1, wherein said semi-spherical portions are integral parts of said head.

5. A pivoting joint assembly as in claim 1, wherein said semi-spherical portions are removable parts of said head.

* * * * *